United States Patent
Dvorak

(10) Patent No.: US 9,316,245 B2
(45) Date of Patent: *Apr. 19, 2016

(54) QUICK ATTACHING AND DETACHING NUT

(71) Applicant: VISENUT LLC, Houston, TX (US)

(72) Inventor: Steven G. Dvorak, Houston, TX (US)

(73) Assignee: Visenut LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,494

(22) Filed: Sep. 23, 2013

(65) Prior Publication Data

US 2014/0023458 A1    Jan. 23, 2014

Related U.S. Application Data

(63) Continuation of application No. 12/694,233, filed on Jan. 26, 2010, now Pat. No. 8,540,471, which is a continuation-in-part of application No. 11/773,201, filed on Jul. 3, 2007, now abandoned.

(60) Provisional application No. 60/806,591, filed on Jul. 5, 2006.

(51) Int. Cl.
*F16B 37/08* (2006.01)
*F16B 1/00* (2006.01)

(52) U.S. Cl.
CPC ......... *F16B 37/0885* (2013.01); *F16B 37/0821* (2013.01); *F16B 37/0857* (2013.01); *F16B 37/0864* (2013.01); *F16B 37/0878* (2013.01); *F16B 37/0892* (2013.01); *F16B 2001/0035* (2013.01)

(58) Field of Classification Search
CPC ............ F16B 37/0885; F16B 37/0892; F16B 37/0857; F16B 37/0821; F16B 37/0878; F16B 2001/0035
USPC ......................................... 411/267, 432–434
See application file for complete search history.

(56) References Cited

U.S. PATENT DOCUMENTS

| 1,475,907 | A | * | 11/1923 | Volman | 411/433 |
| 3,695,139 | A | * | 10/1972 | Howe | 411/432 |
| 4,378,187 | A | * | 3/1983 | Fullerton | 411/267 |
| 4,462,731 | A | * | 7/1984 | Rovinsky et al. | 411/433 |
| 4,657,458 | A | * | 4/1987 | Wollar et al. | 411/182 |
| 5,032,048 | A | * | 7/1991 | Walton et al. | 411/433 |
| 5,277,459 | A | * | 1/1994 | Braun et al. | 285/419 |
| 5,340,252 | A | * | 8/1994 | Weddendorf | 411/267 |
| 5,791,845 | A | * | 8/1998 | Fulop | 411/42 |
| 7,388,149 | B2 | * | 6/2008 | Doherty et al. | 174/21 JS |
| 7,422,404 | B2 | * | 9/2008 | Kitamura et al. | 411/268 |
| 8,257,004 | B2 | * | 9/2012 | Smith | 411/265 |
| 2003/0156922 | A1 | * | 8/2003 | Giehl | 411/432 |

* cited by examiner

*Primary Examiner* — Gary Estremsky
(74) *Attorney, Agent, or Firm* — Gordon G. Waggett, P.C.

(57) ABSTRACT

A nut assembly comprises a capture nut having a smooth bore adapted to fit around the threads of a threaded member such as a bolt or a threaded rod. The capture nut includes a tapered bowl which defines a hexagon in cross section, for example. The nut assembly further includes a split nut having a surface which snugly mates with the tapered bowl of the capture nut. The split nut engages the threads of the threaded member, but only after the split nut is brought into close proximity to the capture nut, thereby avoiding the need to thread the nut assembly the entire length of the threads of the threaded member. The split nut may be formed to two separable pieces, or it may be formed of two integral halves joined together by a thin membrane.

20 Claims, 3 Drawing Sheets

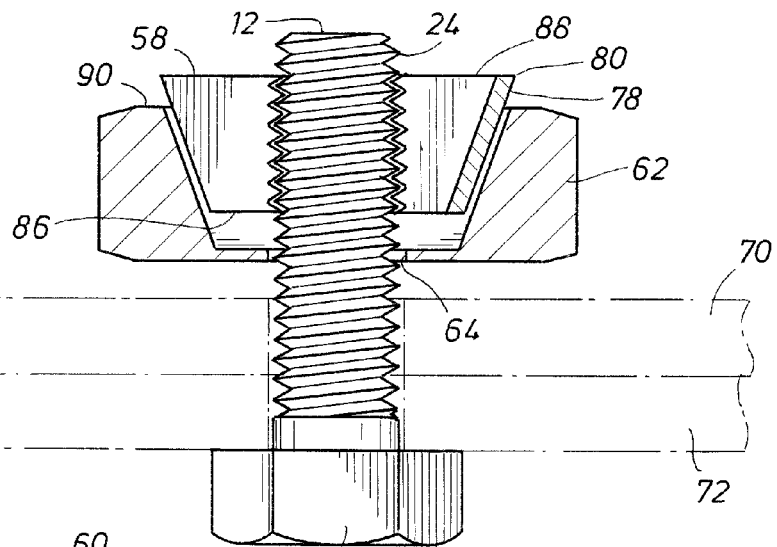
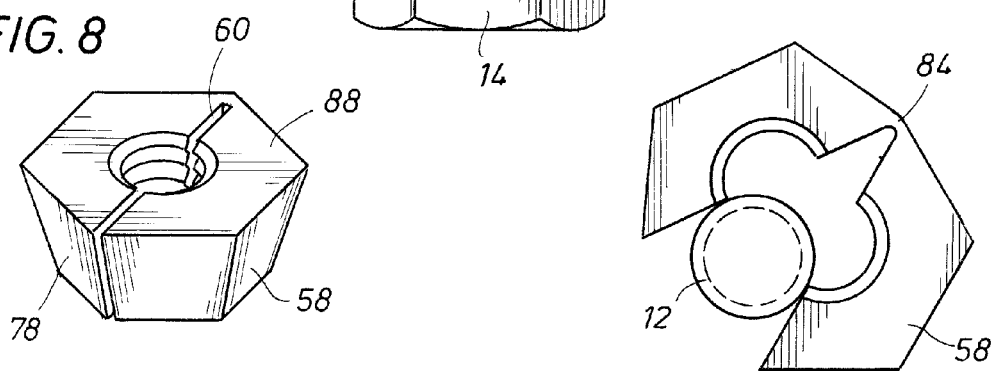
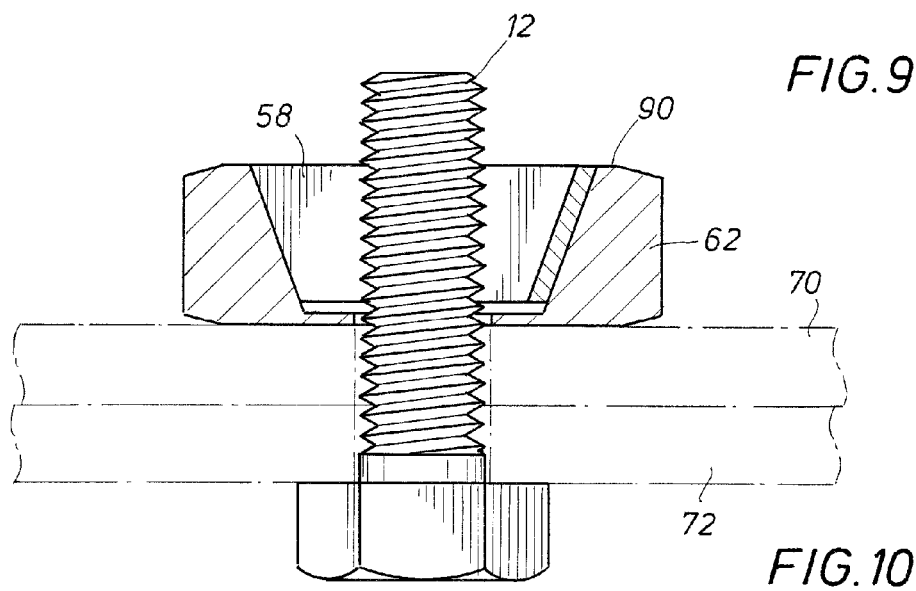

QUICK ATTACHING AND DETACHING NUT

CROSS-REFERENCE TO RELATED APPLICATIONS

This application is a Continuation application of U.S. patent application Ser. No. 12/694,233 filed Jan. 26, 2010, issuing as U.S. Pat. No. 8,540,471 which in turn is a Continuation-in-Part of U.S. patent application Ser. No. 11/773,201 filed Jul. 3, 2007, now abandoned which in turn claims the benefit of U.S. Provisional Patent Application No. 60/806,591 filed Jul. 5, 2006, now expired.

FIELD OF THE INVENTION

The present invention relates generally to the field of nuts adapted to be threaded onto bolts and, more particularly, to a nut split vertically and having internal threads to engage external threads of a bolt and further having a tapered side adapted for abutting engagement with a drive nut. The invention further relates to such a split nut that is cut almost but not quite all the way through so that the two halves of the nut are held together with a thin membrane long enough until the nut can be placed into position on an elongated thread.

BACKGROUND OF THE INVENTION

Conventional nuts and bolts are notoriously well known and are used for an almost limitless variety of applications for joining one structural member to another. Hexagonal nuts are the most common types of nuts, although square and other types are also used. Typically, a nut has internal threads and threads into a bolt having external threads.

For the vast majority of applications, the simple hex nut and bolt combination is perfectly satisfactory. However, some applications call for a relatively long bolt with a relatively large number of threads for the nut to engage and thread over before the nut reaches the end of travel. In such applications, the nut must be turned for an inordinately long period of time before the nut can be tightened. In other applications, the end of the bolt onto which the nut is initially engaged may become damaged through cross-threading, impact damage, corrosion, or other damage. In this case, the nut may not pass over the damaged thread area in order to thread down over the remainder of the bolt.

More et al. in U.S. Pat. No. 6,799,930 taught a quick release nut formed of a pair of body members or segments having internal surfaces to be placed around and engage the shaft of a bolt. The segments were movable between an operative position and an inoperative position in which the segments are spaced further apart. A pin and quick release cartridge on segment slide within corresponding channels in segment, and a pair of ball bearings were released from the groove by pushing the end of pin axially relative to the quick release cartridge. Unfortunately, the segment halves remained coupled together, whether in the operable or inoperable position, and thus if the head of the bolt to which the nut is to be attached is in physical contact with a board or plate through which the bolt extends, then the nut of More et al. cannot be attached.

This drawback in the art was not a problem with the divided nut construction of Shaffrey, U.S. Pat. No. 2,377,581. The divided nut of Shaffrey included two nut halves which were secured in assembly by a pair of double head links. The heads were of a prismatic form, and the key forming element was laterally undercut from each side to provide a connecting or tension link or bar. The heads where then pinned in place.

While the divided nut of Shaffrey did not suffer the drawback of More et al., the complex head construction, and the requirement for pins to retain the two halves of the nut together, make this structure impractical as a construction hardware element. The cost and the time required to assemble the nut in situ outweigh any benefit provided by the divided nut.

Thus, there remains a need for a mechanical nut device which quickly attaches and detaches to a threaded member such as a bolt or a threaded rod without the need to thread the nut onto the end of the threaded member. The nut should be separable so that it need not be slid down the entire length of the bolt to which it is to attach, and should be simple and inexpensive, costing little more than a conventional on-piece nut. The present invention is directed to filling this need in the art.

SUMMARY OF THE INVENTION

The present invention addresses these and other needs in the art by providing a nut assembly comprising a capture nut having a smooth bore adapted to fit around the threads of a threaded member such as a bolt or a threaded rod. The capture nut includes a tapered bowl which defines a hexagon in cross section, for example. The nut assembly further includes a split nut having a surface which snugly mates with the tapered bowl of the capture nut. The split nut engages the threads of the threaded member, but only after the split nut is brought into close proximity to the capture nut, thereby avoiding the need to thread the nut assembly the entire length of the threads of the threaded member.

The split nut is preferably provided with registration portions to align the split nut. The split nut halves may also be magnetized, so that the halves are attracted to one another and are thereby retained about the threaded member. The split nut may also be ringed by a flexible band biasing the halves toward one another. A smooth bore tube to hold the threads of the split nut away from the threads of the threaded member may be employed until the split nut is brought into proximity to the capture nut. The tube is then removed so that the threads of the split nut engage the threads of the threaded member.

These and other features and advantages of the present invention will be readily apparent to those of skill in the art from a review of the following detailed description along with the accompanying drawings.

BRIEF DESCRIPTION OF THE DRAWINGS

FIG. 7 is a side section view of a presently preferred embodiment of a quick attaching nut of this invention as it is fitted onto a threaded member holding a member to be retained.

FIG. 8 is a perspective view of a split nut with a thin membrane holding the two halves of the nut together.

FIG. 9 is a top view of the split nut of FIG. 8 with the nut opened enough to permit mounting the nut onto a threaded member without separating the nut halves from each other.

FIG. 10 is a side section view of the presently preferred embodiment of the nut in a fully mounted orientation.

DETAILED DESCRIPTION OF PREFERRED EMBODIMENTS

Figure 1:
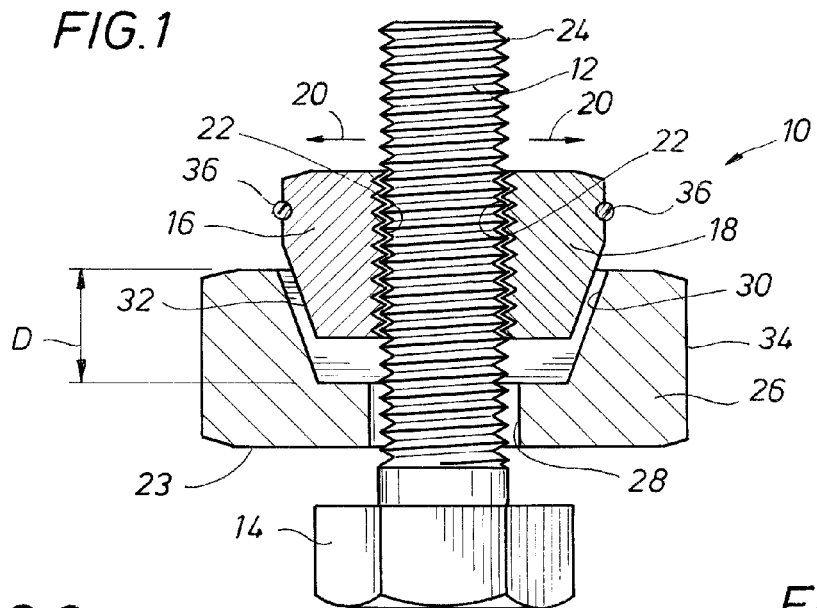
FIG. 1 is a side section view of a quick attaching nut of this invention as it is fitted onto a threaded member, such as a bolt.
Figure 2:
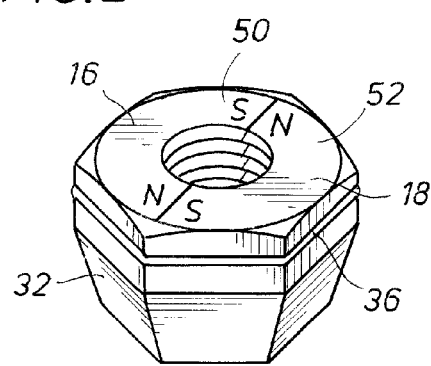
FIG. 2 is a perspective view of a split nut of this invention.
Figure 2A:
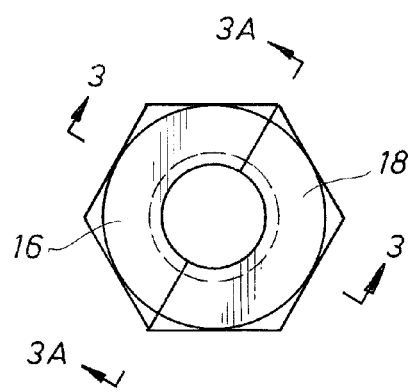
FIG. 2A is a top view of the split nut of this invention.

Referring first to FIG. 1, a quick-attaching nut combination or assembly 10 is illustrated. The nut combination 10 is illustrated as it is attached to a threaded member such as a bolt 12 having a head 14, although the invention is equally adapted to couple to any elongate threaded rod. The nut combination 10 includes a split nut made up of a first nut half 16 and a second nut half 18, which may move away from one another as shown by arrows 20. The arrangement of the split nut halves is also illustrated in FIG. 2A. Each of the split nut halves includes interior threads 22 having proper pitch and run to engage exterior threads 24 of the bolt 12 when the halves move in a direction opposite to that of the arrows 20.

Figure 4:
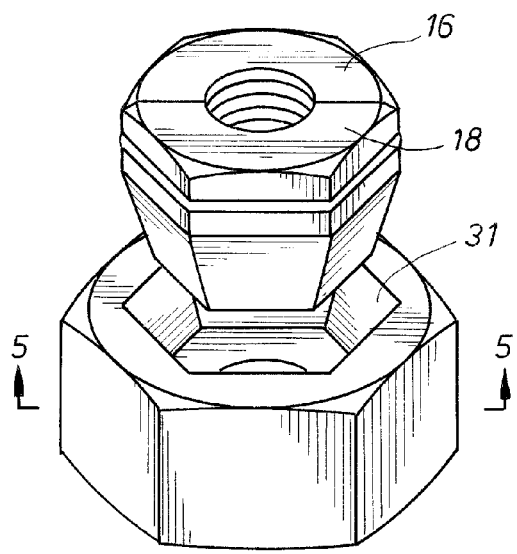
FIG. 4 is a perspective view of a split nut and a capture nut into which it fits.
Figure 5:
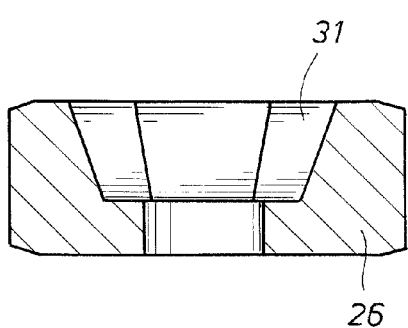
FIG. 5 is a side section view of the capture nut, taken along section lines 5-5 of FIG. 4.

The nut combination 10 further includes a capture nut 26. The capture nut 26 defines a smooth bore 28 large enough to clear the threads 24. A bottom surface 23 of the capture nut 26 abuts a member to be secured by the nut combination, as shown and described below in respect of FIGS. 7 through 10. The capture nut 26 also defines a bowl 30 having a plurality of slanting, entirely flat planar surfaces 31 (see FIGS. 4 and 5), preferably six such surfaces, to mate with complementary entirely flat planar surfaces 32 on the bottom of the split nut halves. Preferably, the capture nut 26 defines an outer periphery 34 having six sides so that the capture nut may be engaged and turned by a hex-wrench (not shown) in the conventional manner.

In operation, when securing a structural member (not shown) between the head 14 of the bolt 12 and the capture nut 26, the capture nut is first run onto the threaded member or bolt 12. Since the bore 28 is smooth, no resistance is met when sliding the capture nut down the bolt 12. Next, the two nut halves 16 and 18 are placed just above the capture nut, with the inner threads 22 of the nut halves 16 and 18 engaging the outer threads of the bolt 12. Next, the capture nut is raised until the bowl surfaces 31 engage the surfaces 32 of the nut halves enough so that turning the capture nut 26 also turns the nuts halves. Eventually, the capture nut will contact the structural member to be secured, and further turning of the capture nut draws the nuts halves down into tight contact with the capture nut.

To release the nut assembly 10, the capture nut is turned in the opposite direction, moving the capture nut and the nut halves up the threads of the bolt 12. Once the capture nut has been moved up the bolt by a distance of at least a depth D of the bowl, then the nut halves clear the capture nut and can be separated from the bolt, without having to thread the nut halves the entire length of the rod. Finally, the capture nut may be withdrawn from the bolt.

Figure 3:
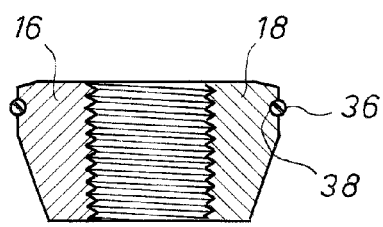
FIG. 3 is a side section view of the nut, taken along section lines 3-3 of FIG. 2A.

In one embodiment, the nut halves 16 and 18 include a groove 36, which may receive an elastic band 38 (FIG. 3), if desired, to hold the nut halves loosely together while the nut halves are deployed into position. If the elastic band is used, then the halves must be held back away from each other to clear the threads 24 of the bolt. For larger size nuts in accordance with this invention, the elastic band may be formed of metal or other sturdier material.

In another preferred embodiment, the nut halves are formed of permanent magnets, so that they attract one another. This embodiment is illustrated in FIG. 2, when the term "N" designates a north pole and the term "S" designates a south pole, for example.

Figure 6:
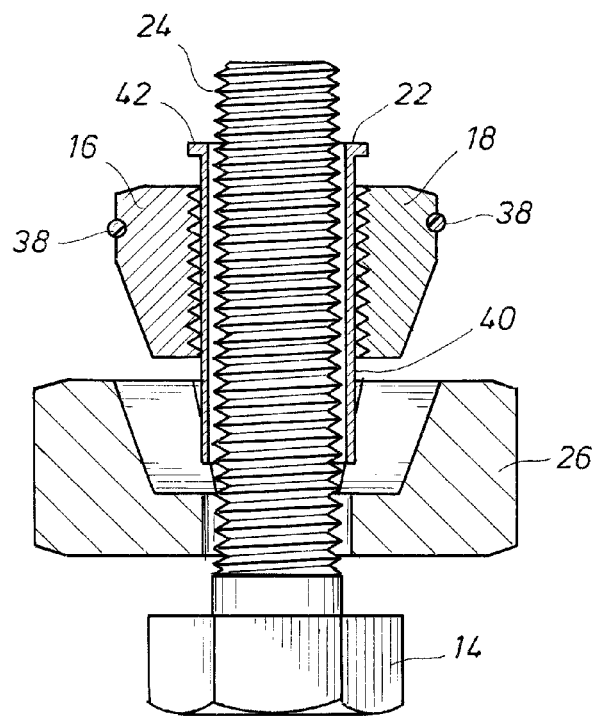
FIG. 6 is a side section view of the nut assembly with a barrier tube in place to keep the threads of the split nut from engaging the threaded member until actuated by the user.

FIG. 6 depicts another embodiment of the invention. In this embodiment, a hollow tube 40 is placed between the inner threads 22 of the nut halves 16 and 18, and the outer threads 24 of the bolt 12. In this way, the smooth inner surface of the tube slides easily off the bolt threads, eliminating the need to carefully hold the nut halves apart during the deployment of the nut halves. The tube 40 preferably includes a flange 42 to facilitate removal of the hollow tube, once the split nut has been deployed adjacent the capture 26.

Returning to FIGS. 2 through 5, inclusive, the preferred arrangement of the split nut and its mating capture nut are illustrated. Those of skill in the art will appreciate that the nut halves 16 and 18 are not identical. Thus, when the split nut is to be assembled, the worker must select one each of the halves 16 and 18; otherwise, the threads 22 on the interior surface of the split nut will not mate up. Also, the worker must take care so that the halves are aligned to properly match up the threads. To assist a worker, the top surface of the nut half 16 is preferably colored with a first color 50 (FIG. 2) and the nut half 18 is preferably colored with a second, contrasting color 52, so that the two may easily distinguished from each other.

Figure 3A:
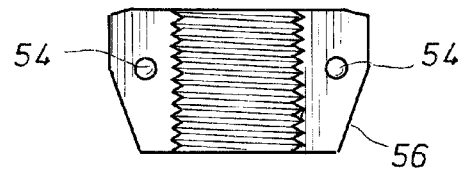
FIG. 3A is a side view of one half of the nut, as shown along sight lines 3A-3A of FIG. 2A.

FIG. 3A illustrates another feature of the invention, including registration elements 54, which are preferably conically shaped protrusions, with mating detents on opposing surfaces to receive the protrusions. This way, the user can more easily match up the nut halves and align them for proper mating of threads. Thus, each of the nut halves defines a surface 56 facing the complementary face of the opposing nut half, and the registration element aligns the nut halves together.

FIGS. 7 through 10 depict another embodiment of a split nut 58 of this invention, wherein the nut is formed with a split or cut 60 that goes almost but not quite all the way from one side of the nut 58 to the other. The partial cut 60 leaves a thin membrane 84 that retains the two halves of the nut together when the nut is spread apart for installation onto the threaded member 12. As shown in FIG. 9, as the split nut 58 is opened to receive the bolt 12, the membrane 84 remains intact and holds the two halves together, even after the split nut is nested with the capture nut, and shown in FIGS. 7 and 10.

Split nut 58 defines a plurality of slanted exterior surfaces 78 which extend from a bottom surface 86 of the nut to a top surface 88 of the nut and meet the top surface at a shoulder 80 defining an acute angle, not at a right angle in other preferred embodiments. In this way, the top surface 86 of the nut is flush with a top surface 90 of a capture nut 62 of the invention. Further, the capture nut 62 defines a narrow shoulder 64 at the opening for the bolt 12 to make it easier to slide the capture nut over the threads 24 of the bolt 12. Preferably, the thickness of the shoulder is less than the distance between adjacent lands of the threads 24.

Finally, FIG. 10 depicts the quick acting nut of this invention fully installed to retain plate members 70 and 72 together, selected for illustrative purposes only. Once the nut has been installed, it can be easily removed by simply rotating the capture nut, with the split nut retained therein, until the combination has been moved up the threads by a distance at least equal to the thickness of the capture nut. Then, the split nut can be spread apart until the nut can be removed from the bolt, and then the capture nut may be slid up the bolt and removed therefrom.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

What is claimed is:

1. A nut assembly arranged for mounting on a threaded member, the nut assembly comprising:
   a. an axially oriented capture nut comprising:
      i. an outer, wrench-engaging surface, a top surface and a bottom surface;
      ii. a bowl defining a plurality of slanted, entirely flat, planar surfaces slanting downwardly and inwardly from the capture nut top surface toward the capture nut bottom surface to a depth D, each flat planar surface having opposed vertical edges, each flat planar surface being aligned about such axis and sharing such opposed vertical edges with an adjacent of such flat planar surfaces; and
      iii. a bore through the bowl on the axis of the capture nut for passing a threaded member through the capture nut; and
   b. a nut comprising:
      i. a top surface, a bottom surface, and an outer surface comprising a corresponding plurality of slanted, entirely flat, planar surfaces extending downwardly and inwardly from the nut top surface to a depth D' for mating engagement with the bowl of the capture nut; and
      ii. an internally threaded bore, coaxial with the bore of the capture nut, for engagement with the threaded member;
      wherein the nut is divided vertically along the axis into two separate, opposed nut halves each having a complementary vertical face facing the complementary face of the opposing nut half.

2. The nut assembly of claim 1, further comprising a membrane which joins the nut halves.

3. The assembly of claim 1, wherein the nut halves are magnetized to retain the nut halves releasably together.

4. The assembly of claim 1, wherein the nut halves are different from one another.

5. The assembly of claim 4, wherein the different nut halves are color coded different from one another.

6. The assembly of claim 1, further comprising a radial groove around the nut halves.

7. The assembly of claim 6, further comprising an elastic band arranged to releasably fit into the groove.

8. The assembly of claim 1, further comprising a registration element to align the nut halves together.

9. The assembly of claim 8, wherein the registration element comprises a conical protrusion on the surface of one nut half and a mating detent on the other nut half.

10. The assembly of claim 1 wherein the each opposed nut half comprises three slanted, flat planar surfaces and the bowl comprises six slanted, flat, planar surfaces.

11. The assembly of claim 1 wherein depth D and depth D' are different.

12. The assembly of claim 1 wherein depth D and depth D' are the same.

13. The assembly of claim 1 wherein the tapered bowl defines a hexagon in cross section, and wherein the opposed nut halves, when placed together vertical face to vertical face also defines a hexagon in cross section.

14. A nut assembly arranged for mounting on a threaded member, the nut assembly comprising:
   a. an axially oriented capture nut comprising:
      i. an outer, wrench-engaging surface;
      ii. a bowl defining a plurality of slanted surfaces; and
      iii. a bore through the bowl on the axis of the capture nut for passing a threaded member through the capture nut; and
   b. a pair of opposed nut halves comprising:
      i. a bottom surface for mating engagement with the bowl of the capture nut; and
      ii. an internally threaded bore, coaxial with the bore of the capture nut, for engagement with the threaded member;
      wherein the nut halves are magnetized to retain the nut halves releasably together.

15. The assembly of claim 14, wherein the nut halves are different from one another.

16. The assembly of claim 15, wherein the different nut halves are color coded different from one another.

17. The assembly of claim 14, further comprising a radial groove around the nut halves.

18. The assembly of claim 17, further comprising an elastic band arranged to releasably fit into the groove.

19. The assembly of claim 14, wherein each of the nut halves defines a surface facing the complementary face of the opposing nut half, and further comprising a registration element to align the nut halves together.

20. The assembly of claim 19, wherein the registration element comprises a conical protrusion on the surface of one nut half and a mating detent on the other nut half.

* * * * *